United States Patent
Nelson

(10) Patent No.: US 12,380,546 B2
(45) Date of Patent: Aug. 5, 2025

(54) SYSTEMS AND METHODS OF COMPUTER VISION-BASED TAMPER DETECTION OF CAMERA SYSTEMS

(71) Applicant: Rhombus Systems, Sacramento, CA (US)

(72) Inventor: Christopher Paul Nelson, Woodland, CA (US)

(73) Assignee: Rhombus Systems

( * ) Notice: Subject to any disclaimer, the term of this patent is extended or adjusted under 35 U.S.C. 154(b) by 208 days.

(21) Appl. No.: 18/222,338

(22) Filed: Jul. 14, 2023

(65) Prior Publication Data

US 2025/0022112 A1    Jan. 16, 2025

(51) Int. Cl.
G06T 7/00 (2017.01)
G06T 7/13 (2017.01)
H04N 23/56 (2023.01)

(52) U.S. Cl.
CPC .............. G06T 7/0002 (2013.01); G06T 7/13 (2017.01); H04N 23/56 (2023.01); *G06T 2200/24* (2013.01); *G06T 2207/10152* (2013.01); *G06T 2207/20092* (2013.01)

(58) Field of Classification Search
CPC ..... G06T 7/0002; G06T 7/13; G06T 2200/24; G06T 2207/10152; G06T 2207/20092; G06T 2207/30168; H04N 23/56; H04N 17/002

See application file for complete search history.

(56) References Cited

U.S. PATENT DOCUMENTS

| 10,474,082 | B2 * | 11/2019 | Tomii | ...... G03G 15/55 |
| 10,907,968 | B1 * | 2/2021 | Tiana | ...... H04N 23/6811 |
| 2020/0342661 | A1 * | 10/2020 | Taylor | ...... G06T 17/05 |

* cited by examiner

*Primary Examiner* — Gevell V Selby
(74) *Attorney, Agent, or Firm* — Foley & Lardner LLP

(57) ABSTRACT

Systems and methods in accordance with the present disclosure relate to an image capture device to perform computer vision-based tamper detection of the image capture device. A system can use a light source, such as an infrared LED, to illuminate an image captured by the image capture device, which can be used to validate error conditions, such as tamper events. For example, the LED-illuminated image can be compared with an image captured while the LED is off to distinguish tamper events or other error condition events from false positives. The tamper detection can be performed to filter initial error detections, such as error detections performed using edge detection or other computer vision operations, that may be susceptible to false positives.

20 Claims, 5 Drawing Sheets

SYSTEMS AND METHODS OF COMPUTER VISION-BASED TAMPER DETECTION OF CAMERA SYSTEMS

BACKGROUND

The present disclosure relates generally to the field of camera systems. More particularly, the present disclosure relates to systems and methods of computer vision-based tamper detection of camera systems.

Camera systems can include one or more cameras deployed in an environment, such as by being positioned inside and/or outside of buildings. The cameras can be used to perform various operations, including but not limited to object detection, person detection, motion detection, or various combinations thereof. For example, images detected by the cameras can be used to detect whether the cameras have been or are being tampered with. However, tamper detection operations can be susceptible to false positives due to various factors associated with how the tamper detection operations process the images and/or data extracted from the images.

SUMMARY

In various implementations, systems and methods in accordance with the present disclosure can be used to accurately detect error conditions associated with camera operations, such as to accurately determine whether cameras are being tampered with or have been tampered with. For example, the system can cause a light element, such as an infrared light-emitting diode (LED), to emit light into an area monitored by one or more cameras, and evaluate images detected based on the emitted light in order to detect and/or validate error conditions, such as tamper conditions. By using the light from the LED for the images that are captured by the one or more cameras, the system can more accurately distinguish conditions indicative of tampering, such as an object or material being used to at least partially cover a camera, as compared to conditions that may otherwise result in false positives from the computer vision operations used to perform tamper detection, such as when lighting in the monitored area rapidly changes (e.g., due to a door of a room monitored by the camera opens and the brightness outside the room is significantly different than the brightness inside the room).

At least one aspect relates to a camera system. The camera system can include at least one image capture device, at least one light source coupled with the at least one image capture device, and one or more processors. The one or more processors can detect an error condition based on one or more first images captured by the at least one image capture device. The one or more processors can retrieve a second image captured by the at least one image capture device and a third image captured by the at least one image capture device. The second image can be associated with the at least one light source being in an off state, and the third image can be associated with the at least one light source being in an on state. The one or more processors can determine that the error condition is valid based on a comparison of image data of the second image with image data of the third image. The one or more processors can output an indication of the error condition responsive to determining that the error condition is valid.

At least one aspect relates to a method of computer vision-based tamper detection of camera systems. The method can include retrieving, by one or more processors, first image data of one or more first images captured by at least one image capture device while a light source is in an off state. The method can include retrieving, by the one or more processors, second image data of one or more second images captured by the at least one image capture device while the light source is in an on state. The method can include comparing, by the one or more processors, the first image data with the second image data to determine that an error condition is satisfied. The method can include transmitting, by the one or more processors to a client device, a signal indicative of the error condition responsive to determining that the error condition is satisfied.

At least one aspect relates to an image capture device. The image capture device can include an image sensor and one or more processors. The one or more processors can detect an error condition based on first image data from the image sensor. The one or more processors can retrieve second image data and third image data from the image sensor, the second image data associated with the at least one light source being in an off state, the third image data associated with the at least one light source being in an on state. The one or more processors can determine that the error condition is valid based on a comparison of the second image data and the third image data. The one or more processors can output an indication of the error condition responsive to determining that the error condition is valid.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
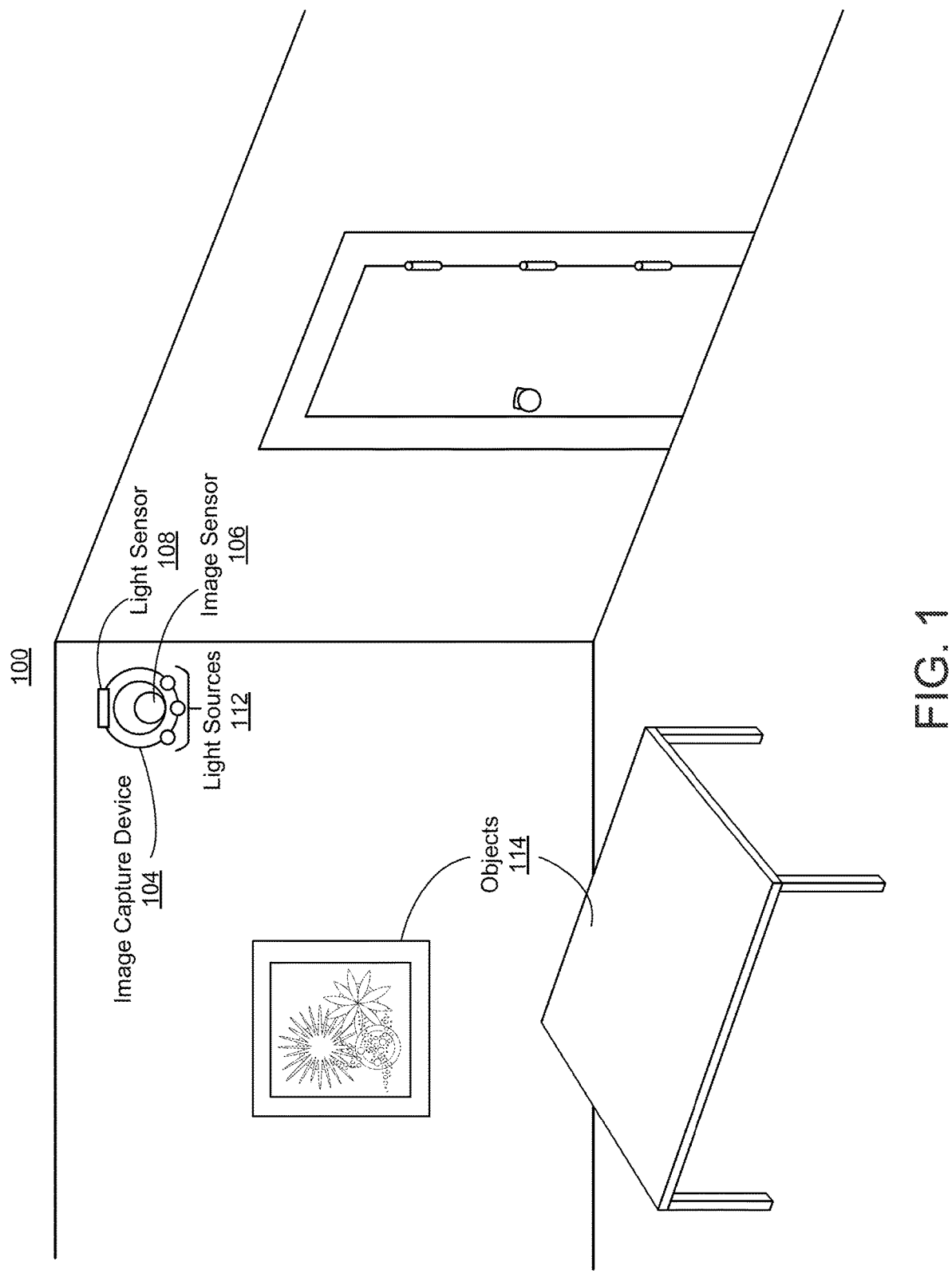
FIG. 1 depicts a schematic diagram of an example of an environment in which a camera is provided.

Before turning to the figures, which illustrate certain implementations in detail, it should be understood that the present disclosure is not limited to the details or methodology set forth in the description or illustrated in the figures. It should also be understood that the terminology used herein is for the purpose of description only and should not be regarded as limiting.

Cameras can be deployed in various environments to capture images, including image frames and video or other sequences of videos, of areas in fields of view of the cameras. For example, cameras can be mounted to structures inside and/or outside of buildings. The cameras can be positioned to monitor areas including, for example and without limitation, rooms, entryways, doorways, halls, access control points (e.g., gates or turnstiles), or windows.

The cameras can include various forms of image processing capabilities and/or be capable of transmitting detected images or image data thereof to one or more remote devices or systems. For example, one or more processors of one or both of a camera or a remote device communicatively coupled with the camera can perform various computer vision or other image processing operations on the image data. Such operations can include, for example and without limitation, event detection, motion detection, object detection, person detection, edge detection, shape detection, error or fault detection, or various combinations thereof.

In some instances, the error detection can include detecting that a camera is or has been tampered with. For example, the camera (or remote device) can process the image data to determine whether the image data satisfies conditions associated with a tamper event. Tamper events can include any of various events in which the images outputted from the camera have been (intentionally or inadvertently) obscured or otherwise made unusable for their purposes or functions. For example, tamper events can include an object, such as a hat or shirt, being positioned to at least partially block a lens and/or field of view of a camera. Tamper events can include disabling the camera. Tamper events can include paint or other material covering the lens or otherwise at least partially obscuring the field of view of the camera.

The processor(s) of the camera and/or remote device can execute any of various image processing operations, including computer vision, to detect a tamper event. For example, tamper events may be detected using various computer vision processes that compare image data amongst various images to detect differences or changes between the images, or parameters or features thereof (e.g., brightness, color, edges, shapes, etc.), that may be indicative of tamper events. In some implementations, error detection indicative of the tamper event is performed based at least on edge detection. For example, the camera can capture a reference image, which may be a static image (e.g., an image in which movement of objects in the field of view of the camera is zero or less than a nominal threshold). The reference image can be processed using an edge detection algorithm to detect one or more reference edges of the reference image. Responsive to a trigger condition, such as a large change in one or more parameters of second image(s) captured by the camera, such as an increase in brightness greater than a threshold increase value, edge detection can be performed on the second image(s) to detect one or more second edges of the second image(s) (to the extent any edges are detected from the second image(s)). A comparison can be performed between the one or more second edges and the one or more reference edges, and an error (e.g., tamper event) can be detected responsive to the comparison indicating at least a threshold difference between the one or more second edges and the one or more reference edges. For example, if an object has been used to cover the camera, at least a subset (if not many or all) of the reference edges may not be detected as second edges, and thus the output of the comparison in such a case can be used to trigger an alert regarding the error condition.

However, various such tamper detection systems and algorithms, including but not limited to the edge detection-based implementations described above, can have false positives (e.g., detecting error conditions responsive to events that are not tamper events). Examples of events that may trigger the error conditions—even if the events are not tamper events—include doors opening (or closing), which may result in significant changes in brightness across images that may lead the edge detection algorithm to not detect edges from image data of images captured during/after the door opens relative to before the door opened. Depending on the sensitivity of the threshold difference used for the comparison of edges to detect tampering, movement in the field of view of the camera, lights turning on or off, or other benign activities occurring in the field of view may similarly satisfy the conditions of the tamper detection algorithms.

Systems and methods in accordance with the present disclosure can more accurately detect events such as tamper events responsive to processing image data from cameras. For example, systems and methods in accordance with the present disclosure can use a light source, such as an LED, to illuminate the environment of the field of view of the cameras in a manner that can reduce or obviate the effects of events that are not error/tamper events on the image data used to perform error/tamper detection. For example, the light source can be operated to filter out the effects of external light sources (e.g., light from an outside room when a door opens) that might otherwise lead to false positives. In some implementations, a camera system can trigger the light source to activate, and cause the image capture device to capture an image of the environment during and/or immediately after (e.g., during a period in which the light from the light source has been reflected or otherwise scattered by objects in the environment and is being received by a sensor of the camera) activation of the light source. The image data from the image can be compared against one or more baseline images (e.g., the reference image used by the initial edge detection-based tamper detection algorithm; a baseline image captured while the light source is off; etc.) to detect the tamper event. For example, if a tamper event is not present, such as if there is no object or material in front of the camera, both images can have relatively low brightness (e.g., be "black" over a wavelength range of image capture by the camera); if a tamper event is present, the light outputted by the light source may be significantly reflected back to the camera (e.g., due to an object or other material in front of the camera), which can result in the image captured with the reflected light to have significantly greater brightness than the baseline image. As such, the system can use the light source to filter out false positives, such as by causing images to be captured than can be used to distinguish tamper events from other events that might otherwise trigger errors or alerts.

In some implementations, the light source includes at least one infrared LED. The infrared light from the infrared LED can be effective for being reflected by objects and/or materials, such as dark (to visible light) or black cloth or clothing, to provide a sufficiently strong signal for reflection relative to the baseline image. In some implementations, the system uses a metric (e.g., average, rolling average, median, etc.) of one or more parameters of a plurality of baseline images to use as baseline data, such as an average brightness. This can allow the system to mitigate the effects of noise or transient conditions on the image data used to validate the error detection and/or detection of tamper events.

FIG. 1 depicts an example of an environment 100 in which an image capture device is provided. The environment 100 can be any setting, location, or place in which an image capture device is provided to capture images of the environment 100. For example, the environment 100 can include or be an office space, a room of a building, a hallway, manufacturing facility, storage space, medical facility, or an outdoors area such as a pavilion or walkway, or any combination thereof. The environment 100 can include objects 114 within it such as furniture, walls, windows, fixtures, or other such static or moving objects 114; as described further herein, images captured by the image capture device 104 may include image data indicative of the objects 114 or features thereof, such as edges, segments, shapes, colors, or other optical or visual features, characteristics, or parameters.

The environment 100 can include an image capture device 104 coupled with at least one light sensor 108 and/or at least one light source 112. The light sensor 108 can detect a parameter indicative of an amount of light in the environment 100 and/or in a field of view of the image capture device 104. The image capture device 104 can trigger operation of the light source 112 according to the parameter detected by the light sensor 108 (e.g., to activate the light source 112 for a night vision mode responsive to the parameter indicating that a brightness or other amount of light in the field of view is less than a threshold).

The image capture device 104 can be a visible light camera (e.g., color or black and white or grayscale), infrared camera, ultraviolet camera, or combinations thereof. The image capture device 104 can be a video camera. The image capture device 104 can include one or more lenses, of which a zoom function can be controlled. The image capture device 104 can include a lens to receive light corresponding to a field of view of the image capture device 104 and to provide the light to an image sensor 106 that generates one or more images based on the received light. The image sensor 106 can provide image data including the one or more images (or video, or an image stream) to any processors and/or communications circuitry of the image capture device 104. The image sensor 106 can include sensor circuitry, including but not limited to charge-coupled device (CCD) or complementary metal-oxide-semiconductor (CMOS) circuitry, which can detect the light received via the lens and generate images based on the received light.

The image capture device 104 can receive light from the environment 100 and generate images and/or image data based on the received light. The image capture device 104 can have respective fields of view. The field of view can correspond to a region of the environment 100 from which a lens or sensor (e.g., the light sensor 108) receives light to generate images. The image capture device 104 can capture still images or videographic information of any sort and may capture image or videographic information with the application of a variety of filters (such as, for example, filters that enable to ability to capture images or video at night). In some implementations, the image capture device 104 can be an infrared camera, a visible light camera, or any combination thereof. The image capture device 104 can output video data, image data, or image stream data.

The image capture device 104 can be positioned in the environment 100 such that its field of view can include images of the whole environment 100 or an area or portion of the environment 100. For example, the image capture device 104 can be positioned within the environment 100 such that the image capture device 104 can capture images of the objects within the environment 100, such as an egress (e.g., a door or window) or furniture. The image capture device 104 can be positioned to capture images of persons or animals within the environment 100. The image capture device 104 can be stationary or mobile. The image capture device 104 can be fixed to a structure in the environment 100, such as walls, ceilings, doors or door frames, struts, or rails in the environment 100. The image capture device 104 can be adjustable in position or orientation, such as being adjustably fixed to a structure in the environment 100. For example, the image capture device 104 can include or be coupled with a drive (e.g., any of a motor, gears, linkages, or combinations thereof) that can be used to adjust at least one of a pan angle or tilt angle of the image capture device 104. The image capture device 104 can be adjusted in position or orientation manually or responsive to control of the drive. The image capture device 104 can be adjusted to orient the field of view towards an area of the environment 100. The image capture device 104 can have predetermined resolutions or fields of view. An image captured for a given field of view can be affected by the light available in the environment.

The image capture device 104 can detect the level of light in the environment 100 using the light sensor 108. The light sensor 108 can be coupled with the image capture device 104. The light sensor 108 can be attached to a surface of the image capture device 104 or mounted on the image capture device 104 such that light sensor 108 can detect the light of the environment 100. The light sensor 108 can be any sensor configured to detect light intensity or brightness, such as a photoresistor, photodiode, or phototransistor. The light sensor 108 can detect light in the visible light spectrum or the invisible light spectrum (e.g., infrared or ultraviolet light). The light sensor 108 can detect an amount of light (e.g., in lumens, lux, degrees Celsius, etc.) within the environment 100. In some implementations, the light sensor 108 can be configured to detect or measure the visible light within the environment 100 and can transfer a measurement of the light to the image capture device 104 or to other devices of a camera system. If the image capture device 104 determines the light detected by the light sensor 108 to be insufficient for capturing images or below a threshold light level, the image capture device 104 can turn on or activate one or more light sources 112.

The light sources 112 can be any source of light to illuminate the environment 100 which the image capture device 104 can capture images of. The light source 112 can include incandescent light bulbs, light-emitting diodes (LED), sodium vapor lamps, or compact fluorescent lights (CFL), among others. The light sources 112 can produce light in the visible or invisible light spectrum. For example, the light sources 112 can include infrared LEDs, which output light in the infrared spectrum. Light output in the infrared spectrum can manifest as heat, or can, in some low visible light environments, register as visible light to the image capture device 104. In some implementations, responsive to a determining that the detected light from the light sensor 108 is below a threshold level, the image capture device 104 can turn on or activate the one or more light sources 112. The image capture device 104 can illuminate (e.g., turn on or activate) the light sources 112 responsive to, for example, the environment being too dark or the light sensor 108 being blocked. For example, the image capture device can illuminate the light sources 112 responsive to darkness caused by nighttime or lighting of the environment 100 being off. As another example, the image capture device 104 can illuminate the light sources 112 responsive to darkness caused by an obstruction of the light sensor 108, such as the light sensor 108 being covered by an object or malfunctioning. In some implementations, the image capture device 104 can illuminate the infrared LED light source 112 as a result of an obstruction of the light sensor 108.

Covering the light source 112 with an object or otherwise blocking the light source 112 from receiving light can be considered tampering with the image capture device 104. In some implementations, the image capture device 104 can be intentionally covered or tampered with to prevent image capture. By tampering with the image capture device 104, the light sensor 108 can be covered, thereby causing the light sensor 108 to detect a low level of light (e.g., light below a threshold value) for the environment 100 despite the environment itself being lit, due to the obstruction causing the light sensor 108 from receiving the light. In some implementations, with the detection of the low level of light, the image capture device 104 can determine to turn on the light sources 112 to better illuminate the environment 100 for image capture. In some implementations, with the detection of the low level of light, the image capture device can transmit images to other components of a camera system.

Figure 2:
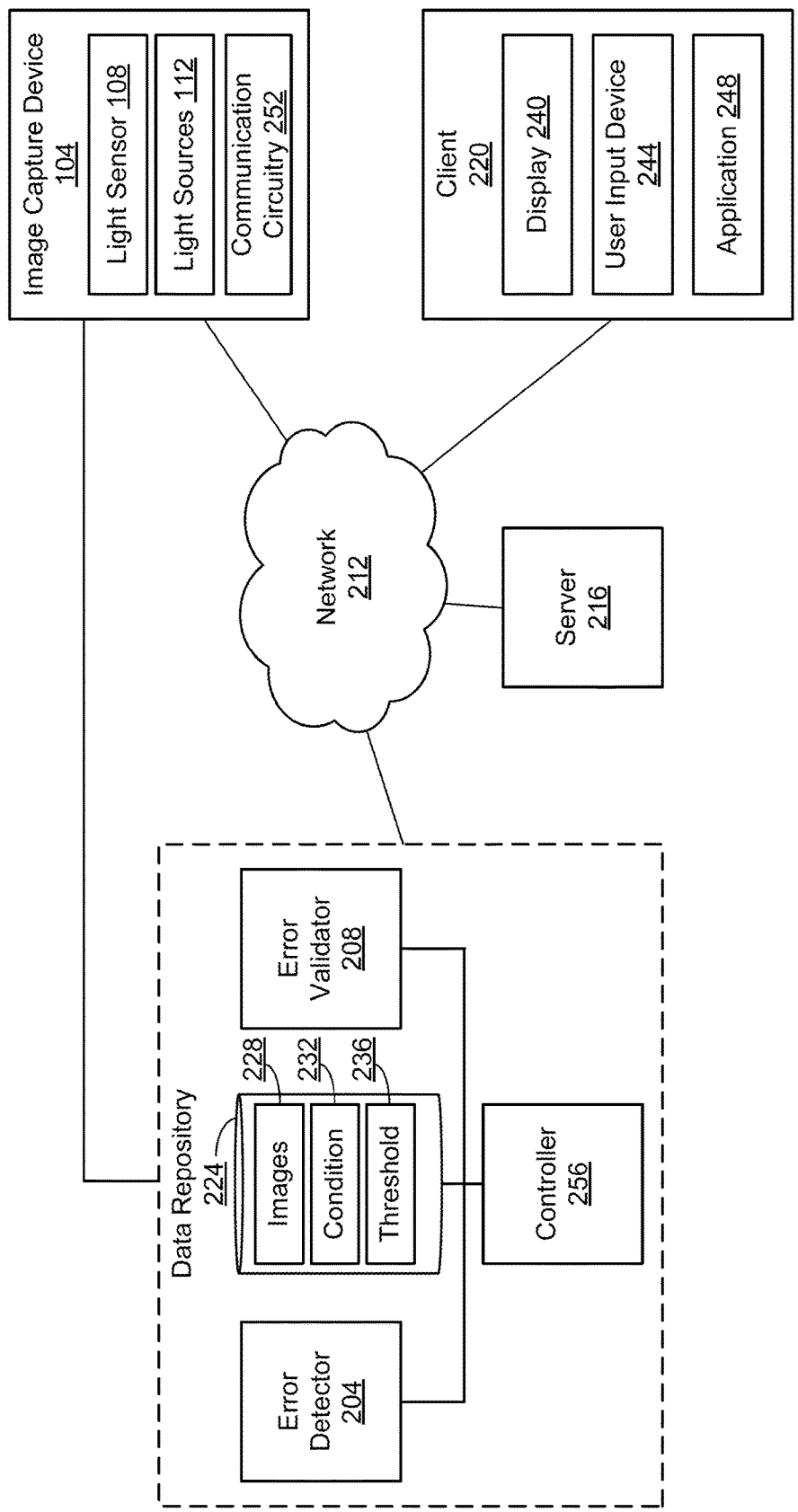
FIG. 2 depicts a block diagram of an example of a camera system.

FIG. 2 depicts an example of a camera system 200. The camera system 200 can include any hardware or software configurable to detect an error condition associated with the image capture device 104, validate the error condition, and transmit an indication of the error condition to one or more devices. The camera system 200 can include at least an error detector 204, an error validator 208, a controller 256, a network 212, a server 216, the image capture device 104, a client 220, or a data repository 224. As depicted herein, the components of the system 200 can include or refer to any of the components or functionalities thereof depicted in the systems and methods of FIG. 1, 3, or 4. Various components of the system 200, including but not limited to the error detector 204 and error validator 208, can include any one or more functions, operations, algorithms, source code, binary or computer-executable instructions, machine learning models, rules, heuristics, or various combinations thereof to enable such components to perform various operations described herein, including but not limited to computer vision operations.

The image capture device 104 can include at least the light sensor 108, the light sources 112, or communication circuitry 252. The communications circuitry 252 can be used to communicate data such as sensor data (e.g., from the light sensor 108) or image data (e.g., from images captured by the image capture device 104) with other image captures devices and remote devices (e.g., via the network 212). The image capture device 104 can use various communication protocols to communicate with various devices, systems, or networks, such as Bluetooth, Bluetooth low energy (BLE), Zigbee, Z-wave, near filed communication (NFC) or WiFi protocols. The communications circuitry 252 can include a cellular transceiver or a cellular modem configured to communicate with a cellular network. The communications circuitry 252 can include a WiFi transceiver for communicating via a wireless communications network. The communications circuitry 252 can communicate via local area networks (e.g., a building LAN), WAN (e.g., the Internet, a cellular network), or conduct direct communications (e.g., NFC, Bluetooth, BLE, Zigbee, Z-wave). The communications circuitry 252 can conduct wired or wireless communications. For example, the communications circuitry 252 can include one or more wireless transceivers (e.g., a WiFi transceiver, a Bluetooth transceiver, a BLE transceiver, an NFC transceiver, a cellular transceiver). The communications circuitry 252 can be coupled with at least one antenna that the communications circuitry 252 uses to receive and transmit data. The communications circuitry 252 can communicate with the various components of the camera system 200 via the network 212.

The various components of the camera system 200 can communicate via the network 212. The network 212 can be any wireless or wired network to facilitate communication, data transfer, transmission, reception, or connection among the components of the camera system 200 or between components of the camera system 200 and outside systems. The network 212 can include any kind of communications link, cable, transmitter, receivers, transceiver, antenna, logic circuit, communication chip, communication network (e.g. a local area network ("LAN"), a wide area network ("WAN"), or an inter-network (the internet), or cellular network (e.g., 3G, 4G, or 5G)). The network 212 can be a private network or a public network. Access to or communication through the network 212 can be accessible for all in a public network. Access to or communication through the network 212 can be restricted for a private network. Restriction for a private network can include the private network restricted to a subset of devices, devices subject to authorization by, for example, security credentials or authentication service, or the private network restricted to specific communications protocols or encryption standards. The network 212 can allow for communication with or between the image capture device 104, the error detector 204, the error validator 208, the controller 256, the data repository 224, the server 216, or the client 220.

The camera system 200 can include, access or otherwise communicate with or utilize one or more clients 220 (e.g., client devices). The client 220 can be any combination of hardware and software to communicate with components of the camera system 200, such as the error validator 208 or the image capture device 104. The client 220 can be a device internal to the camera system 200, or the client can be external to the camera system 200. The client 220 can include one or more systems, components or functionalities of the computing system 400 depicted in FIG. 4. The client 220 can include a display 240, a user input device 244 (hereinafter referred to as the UI device 244), or an application 248. The client 220 can refer to or include a mobile computing device, such as a smartphone, wireless telecommunications device, tablet, or wearable computing device (e.g., smart watch or smart glasses), a personal computer (e.g., laptop, desktop, tablet, workstation), an appliance with computing capabilities (e.g., a smart television or refrigerator), or other such computing device configured to perform the functions described herein. In some cases, the client 220 can refer to or include a smart card, such as a physical card that includes an embedded integrated chip.

The client 220 can communicate with one or more components or systems of the camera system 200 by, for example, the network 212 or the communications circuitry 252. The client 220 can communicate with one or more systems or components of the camera system 200 including, for example, the server 216, the image capture device 104, the error detector 204, the error validator 208, the controller 256, or the data repository 224. The client 220 can transmit a request to any of the components of the camera system 200. For example, the client 220 can transmit a request via the application 248 of the client 220 to connect with the image capture device 104. The client 220 can receive a request or information from any of the components of the camera system 200. For example, the client 220 can receive information via the application 248 operating on the client 220 to present on the display 240 of the client 220.

The client 220 can host, execute, or run the application 248. The client 220 can launch or invoke the application. The application 248 can be provided by a manufacturer of the camera system 200 or the image capture device 104. For example, the client 220 can download the application 248 via an online application store or marketplace. The application 248 can be developed or provided by the manufacturer of the image capture device 104 or by an outside party. The manufacturer of the image capture device 104 can configure the application 248 to communicate or interface with the image capture device 104 or the error validator 208. The client 220 can execute the application 248 to cause the application to communicate with the image capture device 104 via the communication circuitry 252 of the image capture device 104.

The client 220 can include a display 240. The display 240 can be any screen coupled with the client 220 to display at least the application 248. The display 240 can include a touch screen, organic light-emitting diode (OLED), or liquid crystal display (LCD), among others. In some implementations, the client 220 can receive from components of the camera system 200, such as the error validator 208, instructions to present on the display 240 via the application 248 executing on the client 220. For example, the error validator 208 can send an indication or message to present on the display 240. In some implementations, the display 240 can include the UI device 244.

The client 220 can include a user input (UI) device 244. The UI device 244 can be any device coupled with the client 220 to accept input to the client 220. The UI device 244 can include a keyboard, mouse, button, microphone, controller (e.g., joystick or video game controller), or haptic device to transfer input from a user of the client 220 to the client 220. The UI device 244 can include or be coupled with the display 240. For example, the UI device 244 can be a touchscreen which presents on the client 220 as well as accepts input. In some implementations, the client 220 can receive input from the UI device 244 to control or communicate with the components of the camera system 200, such as the image capture device 104 or the controller 256. In some cases, the client can accept settings for operation of the camera system 200 via the UI device 244. In some cases, the UI device 244 can accept input to download the application 248 from, for example, the server 216.

The server 216 can refer to one or more computing systems which facilitates communications between the components of the camera system 200 or an external computing system. The server 216 can be or include one or more components or functionality of a computing system, including, for example, one or more processors and memory. The server 216 can refer to or include a cloud computing environment. The server 216 can communicate with the components of the camera system 200 via network 101. For example, the server 216 can receive data or transmit data to the image capture device 104 or the error detector 204. The server system 142 can provide instructions, software, or commands to the camera system 200 to facilitate validating an error condition. The server 216 can update or add to the data repository 224.

The data repository 224 can be any memory, storage, or cache for storing information or data structures that facilitates the camera system 200 to detect and validate an error condition. The data repository 224 can contain any information about the camera system 200 and can allow that information to be accessed or read by any components of the camera system 200. The image capture device 104, the error detector 204, the error validator 208, the controller 256, or the server 216 can write information to the data repository 224. The data repository 224 can store, maintain, or otherwise include data such as one or more images 228, one or more conditions 232, or one or more thresholds 236. The images 228 can be or include any images captured by the image capture device 104, such as still images, video, streams of images, or other such images described herein. In some implementations, the image capture device 104 can store a captured image in the data repository 224 for access by other components of the camera system 200.

The data repository 224 can include the condition 232. The condition 232 can be a data structure that includes one or more qualitative or quantitative parameters or values thereof indicative of various events, such as errors, faults, tampering, or various combinations thereof. The condition 232 can refer to an error condition 232 determinable by components of the camera system 200. The error condition 232 can refer to a condition in which the image capture device 104 has been tampered with. For example, the error condition 232 can include the image capture device 104 being purposely obstructed or prevented from capturing the images 228. In some implementations, the light sensor 108 can detect a level of light which can indicate the error condition 232 (or the error detector 20 can detect the level of light by processing image data from the image capture device 104). For example, if the light sensor 108 detects an amount of light below the threshold 236 for the environment, the error condition 232 related to tampering of the image capture device 104 can be present. The threshold 236 can be or include any level or limit of light, time, distance, or differences. The threshold 236 can be defined by the image capture device 104, the server 216, the error detector 204, or the error validator 208, among others. In some implementations, the threshold 236 can be determined by a user input via the UI device 244 of the client 220. For example, the client 220 can receive an input via the UI device 244 to set a threshold difference of comparison between two or more images 228 captured by the image capture device 104.

The camera system 200 can include at least one controller 256. The controller 256 can include any hardware or software configurable to control operations of the image capture device 104. The controller 256 can communicate with the image capture device 104 via the network 212, or the controller 256 can be coupled with or disposed within the image capture device 104. The controller 256 can control operations of the image capture device 104, such as shutter speed, exposure, frame rate, resolution, or image capture. The controller 256 can instruct, actuate, or otherwise cause the image capture device 104 to capture the image 228. In some implementations, the controller 256 can instruct the image capture device 104 to capture the images 228 periodically or responsive to a trigger event. A trigger event can include a change in the light detected by the light sensor 108, a detection of movement by a movement sensor coupled with the image capture device 104, or an indication or request from another component of the camera system 200.

The controller 256 can modify or change the exposure, frame rate, resolution, or other attributes associated with cameras or image capture devices. The controller 256 can modify the operations of the image capture device 104 responsive to a request or indication from the error detector 204, the error validator 208, or the client 220. In some implementations, the client 220 can accept inputs (e.g., via the UI device 244) to control the operation of the image capture device 104. For example, a user of the client 220 can create settings or preferences for the image capture device 104 through the UI device 244 and the application 248 to control the shutter speed of the image capture device 104.

The controller 256 can control the light sources 112. The controller 256 can transmit a signal to actuate, turn on, or activate the light sources 112. Likewise, the controller 256 can turn off or deactivate the light sources 112. The controller 256 can turn on or off the light sources 112 responsive to a request or indication to turn on the light sources 112 from the client 220, the error detector 204, or the error validator 208. The controller 256 can receive data from the light sensor 108. For example, the controller 256 can receive a measurement of light in the environment from the light sensor 108. The controller 256 can receive the data from the light source 112 continuously, periodically, or responsive to a request sent by the controller 256 for a measurement of light in the environment or other data.

The camera system 200 can include at least one error detector 204. The error detector 204 can include any hardware or software configurable to perform object detection by processing elements of the images 228, such as pixels or group of pixels, to determine an initial state of the environment by detecting edges of reference images 228 captured by the image capture device 104. For example, the error detector 204 can identify features such as colors, shapes, edges, contrast between pixels, and spatial relationships between pixels. The error detector 204 can detect objects by operating spatial filters, segmentation, or machine learning models trained to detect objects.

In some implementations, the error detector 204 can instruct the image capture device 104 to capture one or more reference images 228 to use as a basis of comparison for detection of the error condition 232. The error detector 204 can instruct the image capture device 104 to capture the reference images 228 during an initialization of the camera system 200 (e.g., responsive to first operation of the camera system 200), periodically, or by a push from the controller 256, the server 216 or the client 220. The error detector 204 can detect, determine, or identify edges of the reference images 228. An edge can be detected according to and/or include characteristics such as a shape, color, line, or other identifiable feature of the reference image 228 by which the camera system 200 can compare another image against. For example, the edges can be a window in the environment, a corner of a room of the environment, or a sidewalk of the environment. In this manner, the reference images 228 can serve to provide an initial reference of the environment with which to perform comparisons of subsequent images 228.

The error detector 204 can monitor for or detect the error condition 232 through a comparison of the reference images 228 to subsequent images 228. In some implementations, the error detector 204 can detect the error condition 232 by detecting a threshold 236 difference between the reference image 238 and a first image captured by the image capture device 104. The first image captured by the image capture device 104 can include image data. The image data can include a number or location of pixels, colors within the image, size of the image, resolution of the image, light or exposure of the image, or contrast between pixels or objects within the image. The error detector 204 can, using image recognition methods described herein, determine edges of the first image using the image data of the first image. The error detector 204 can evaluate various images captured by the image capture device 104 to perform error detection in various manners, such as periodically (e.g., according to a schedule), by evaluating a subset of images (e.g., every tenth image), responsive to a trigger condition (e.g., change in brightness), or various combinations thereof.

The error detector 204 can detect a difference between the edges detected within the reference image and the edges of the first image captured by the image capture device 104 subsequent to the capture of the reference image. The difference can include the first image having more edges than the reference image, less edges than the reference image (including no edges), edges in a different orientation than the reference image, edges of a different color than the reference image, edges of a different length than the reference image, or other such differences. The error detector 204 can determine that the difference between the edges exceeds a threshold 236 difference. If the difference between the edges exceeds the threshold 236 difference, the error detector 204 can determine that an error condition 232 exists. Responsive to determination of the error condition 232, the error detector 204 can transmit an indication of the error condition 232 to the error validator 208.

The camera system 200 can include at least one error validator 208. The error validator 208, in some implementations, can be implemented as a filter on outputs of the error detector 204, such as to be triggered responsive to receiving an indication of the error condition 232 from the error detector 204, and validate or reject the error condition 232 responsive to processing one or more images 228. In this manner, false positives of error conditions 232 can be reduced, which can improve accuracy of error and/or tamper event detection, and which can lower computational resources for to alerting the client 220 of erroneous error conditions 232. In some implementations, the error validator 208 includes and/or is implemented as part of the error detector 204. In some implementations, the error validator 208 operates on at least some images or image data used by the error detector 204 (e.g., reference images and/or images used by the error detector 204 to detect errors).

Responsive to receiving indication of the error condition 232 from the error detector 204, the error validator 208 can instruct the controller 256 to cause the image capture device 104 to capture more images 228. In some implementations, the error validator 208 can request two or more images, videos, or series of images with the light source 112 on and off. For example, the error validator 208 can receive, from the image capture device 104 (via the controller 256), a second image 228 wherein the light source 112 is not activated (e.g., the second image 228 is not captured with light outputted by the light source 112) and a third image 228 wherein the light source 112 is activated (e.g., the third image 228 is captured with light outputted by the light source 112 and/or reflected or otherwise scattered by the environment 100 and/or objects in the environment). In some implementations, the error validator 208 includes, in instructions provided to the controller 256 for causing the image capture device 104 to capture images, instructions to control one or more parameters of operation of the image capture device 104 (e.g., exposure, shutter speed, gain, etc.). The error validator 208 can thereby compare the second and third images to determine a threshold difference to evaluate the validity of the error condition 232.

In some implementations, the second image received by the error validator 208 can be the first image (e.g., the first image received by the error detector 204 for comparison to the reference image). The first image can be stored in the data repository for access by the error validator 208, or the error detector 204 or the controller 256 can transmit the first image to the error validator 208. The first image can be used by the error validator 208 as the second image if the first image has been captured with the light source 112 off. In some implementations, the first image can be used by the error validator 208 as the second image if the first image was captured within a threshold 236 period of time from receipt of the indication of the error condition 232 by the error validator 208.

In some implementations, the light source 112 can be on prior to the capture of the second image by the image capture device 104. The controller 256 can determine that at least one of the light sources 112 is on prior to retrieving the second image or prior to instructing the image capture device 104 to capture the second image. The controller 256 can instruct the image capture device 104 to turn off the light source 112 prior to capture or retrieval of the second image.

The error validator 208 can cause the controller 256 to retrieve or capture the third image. The third image can be captured while the light source 112 is on. The error validator 208 can instruct the controller 256 to cause the image capture device 104 to turn on the light sources 112. The error validator 208 can request (via the controller 256) to turn on the light sources 112 responsive to the receipt of the indication of the error condition 232, responsive to the detection of the error condition 232 by the error detector 204, responsive to receipt of the second image, or a combination thereof. In this manner, the error validator 208 can receive the second image with the light source 112 off and the third image with the light source 112 on.

The error validator 208 can instruct the image capture device 104 to capture a series of images 228 for each of the second image and the third image. For example, the image capture device 104 can capture a series of frames as the second image and a series of frames as the third image. By capturing a series of images or frames, the error validator can generate an average of the second image and an average of the third image to reduce the effect of any outlier images or to reduce noise within the images.

Responsive to receiving the second and third images 228, the error validator 208 can determine if the error condition 232 is valid or invalid. The error validator 208 can determine the error condition 232 is valid based on a comparison of image data of the second image with image data of the third image. The error validator 208 can determine that the comparison indicates at least a threshold 236 difference between the image data of the second image and the image data of the third image. The threshold 236 difference between the image data of the second and third image can include a difference between a brightness of the images 228, an exposure of the images 228, pixels or edges of the images (as detected by the error detector 204), an orientation of the images 228, or a combination thereof. For example, the error validator 208 can determine a brightness of the third image and a brightness of the second image. The error validator 208 can determine a difference between the brightness of the two images and that the difference between the brightness of the two images exceeds a threshold 236 difference.

The error validator 208 can determine that the error condition 232 is invalid based on the same comparison. For example, the error validator 208 can determine that the error condition 232 is invalid if the difference between the second and third image does not exceed the threshold 236 difference. If the difference between the second and third images does not exceed the threshold 236 difference, the error validator 208 can determine that the error condition 232 detected by the error detector 204 is a false positive. The camera system 200 can then continue to monitor for error conditions 232.

As an example, the error validator 208 can determine that the error condition 232 is invalid if the image capture device 104 is not being tampered with. In some implementations, a disruption of the image capture device's ordinary environment can cause the error detector 204 to detect a false error condition 232. For example, if a sudden burst of light (e.g., by opening a door, turning on a light in a dark room, etc.) enters the environment, the error detector 204 may not accurately detect edges of the first image. By not accurately detecting edges of the first image, the error detector 204 can falsely determine that an error condition 232 exists. The error detector 204 can transmit the indication of an error condition 232 to the error validator 208. The error validator 208 can instruct the image capture device 104 to capture the second and third images with the light sources 112 in an off and on state, respectively. The error validator 208 can compare the second and third images.

Further to the example above, in some implementations the light sources 112 can be infrared LEDs. When the image capture device 104 is not being tampered with, illumination by the infrared LEDs may not create a significant (e.g., exceeding the threshold 236) difference between the second image and the third image. Tampering, on the other hand, can cause light outputted by the LEDs to be significantly reflected and thus captured in the third image.

As an example, the error validator 208 can determine that the error condition 232 is valid based on the comparison of the second and third image exceeding the threshold 236 difference. In a similar manner as described above, the second image can depict the environment with the light sources 112 off. If the image capture device 104 is being obstructed or tampered with, the second image may be very dark, low brightness, low saturation, low contrast, or combination thereof. For example, if the image capture device 104 has an obstruction in place blocking its field of view, such as a hat or box covering the image capture device 104, the second image can depict a dark, black, or otherwise low brightness image. Furthermore, if the image capture device 104 is being obstructed, the third image can depict an overly saturated or bright image, due to the reflection of the light sources 112 on the object causing the obstruction. For example, infrared LEDs can reflect off of a screen or close obstruction, thereby overly saturating the third image. In this manner, the error validator 208 can determine that the difference between the second and third images exceeds the threshold 236 difference. Henceforth, the error validator 208 can determine, in this example, that the error condition 232 is valid.

In various environments, it can be useful to enable various thresholds for determination of the validity of the error condition 232. The threshold 236 can be determined or received by settings input through the UI device 244. In some implementations, the settings can include a setting for the threshold 236 difference between the reference and first images, or between the second and third images. For example, the threshold 236 for a smaller room can have a higher threshold 236 brightness between the second and third images than a larger room. The settings can include settings related to sensitivity of the system. For example, settings can indicate a threshold 236 time period to wait between consecutive images, such as between the first and second image or the second and third image. The settings can indicate a delay between images, such as a period of time to wait between the capture of any of the images. In some implementations, the settings can indicate a field of view for the image capture device 104. By customizing the settings for different environments, the error validator 208 can determine the validity of the error conditions 232 with greater accuracy and precision, thereby reducing false positives.

In some implementations, responsive to the error validator 208 determining that the error condition 232 is valid, the error validator 208 can output an indication of the error condition 232. The error validator 208 can generate an indication for presentation to the error validator 208, the server 216, the image capture device 104, or the client 220.

The error validator 208 can, for example, generate the indication of the error condition 232 as a message to transmit to the server 216.

The error validator 208 can generate a command with the indication of the error condition 232. The error validator 208 can generate the command and the indication as a signal to cause a remote device (e.g., the client 220, the server 216) to present an alert. The alert can present, indicate, or correspond to the indication of the error condition 232. For example, the error validator 208 can generate a signal including a command with instructions for presentation of the indication via the display 240 and the application 248 executing on the client 220. The command can include instructions to actuate other components of the client, such as a haptic response (e.g., vibration of the client 220) or auditory response (e.g., a beep or ring), or any combination thereof. For example, the error validator 208 can transmit the command and the indication as a signal to the client 220 for presentation via the display 240 of the client and through a loudspeaker of the client 220.

Figure 3:
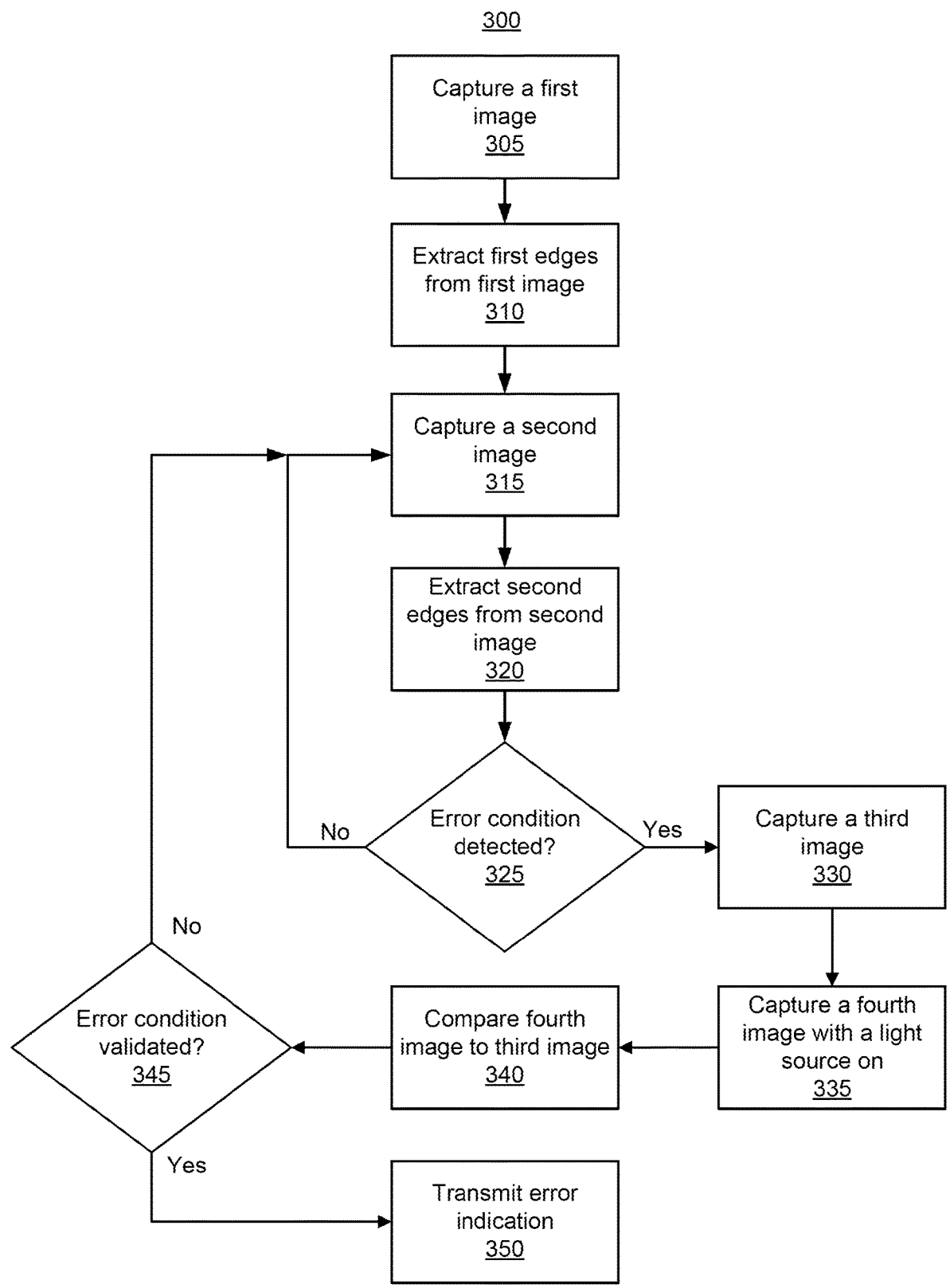
FIG. 3 depicts a flow diagram of an example of a method of computer vision-based tamper detection of one or more cameras.

FIG. 3 depicts an example of a method 300 of tamper detection, such as visual and/or computer vision-based detection of tamper events. The method 300 can correspond to any of the systems or methods depicted in the FIGS. 1, 2, and/or 4A and 4B. Any of the steps depicted with reference to FIG. 3 can be performed by any component of the system, such as any of the components of the camera system 200 depicted in FIG. 2. and in any order. Furthermore the method 300 can include steps not depicted herein.

At 305, an image capture device can capture a first image. The image capture device can capture the first image as a reference or baseline image. The image capture device can capture the first image as an image of an environment, such as the environment 100. The image capture device can transmit the first image to the error detector, or the error detector can retrieve the first image from the image capture device via the controller.

At 310, the error detector can extract first edges from the first image. The error detector can extract the first edges from the first image by the image recognition techniques described herein, such as segmentation or object detection. The error detector can identify the edges from image data of the first image, such as metadata or pixels of the first image. Responsive to extraction of the first edges, the method 300 can proceed to 315, wherein the image capture device can capture a second image.

At 315, the image capture device can capture a second image. The image capture device can capture the second image responsive to the capture of the first image. The image capture device can capture the second image responsive to a trigger event, such a change in the brightness of the environment as detected by the light sensor, a motion detected by a motion sensor of the image capture device (e.g., a person entering the room), a movement of the image capture device detected by an accelerometer or gyroscope coupled with the image capture device, or a loss of power or network connection to the image capture device, among other stimuli. The image capture device can capture the second image periodically, such as by a scheduled interval of image capture. The image capture device can capture the second image responsive to a push or request by other components of the camera system, such as the client or server. Responsive to capture of the second image, the method 300 can proceed to 320.

At 320, the error detector can extract second edges from the second image. The error detector can extract the second edges in a similar manner as extracting the first edges. The error detector can store the extracted edges in the data repository. At 325, the error detector can determine if an error condition is detected. The error detector can determine that the error condition is detected based on a comparison of the first image and the second image indicating a difference between the first image and the second image is above a threshold difference. The error detector can determine that the error condition is not detected or present based on the difference between the first image and the second image being below a threshold difference. If the error detector does not detect the error condition, the error detector can go back to step 315, where the image capture device captures a second image. In this manner, if the error condition is not detected, the camera system can continue to monitor for error conditions. If the error detector detects the error conditions, the process can proceed to step 330.

At 330, the image capture device can capture a third image. The image capture device can capture the third image responsive to the error detector detecting an error condition. The image capture device can capture the third image with the light source off. The image capture device can transmit the third image to the error validator via the controller or the error validator can request the image capture device for the image via the controller. At 335, the image capture device can capture a fourth image with the light source on. The image capture device can turn on the light source responsive to the capture or transmittal of the third image, or responsive to an indication from the error validator via the controller. The image capture device can transmit the fourth image to the image validator or the image validator can request the fourth image from the image capture device.

At 340, the error validator can compare the fourth image to the third image. The error validator can compare the fourth image to the third image to determine a difference between the third image and the fourth image. The error validator can detect, from image data of the third and fourth images, edges, brightness, or other features of the third and fourth images to compare. By comparing the third and fourth images, the error validator can determine a difference between the third and fourth images.

At 345, the error validator can determine if the error condition is validated. The error validator can determine if the error condition indicated by the error detector is validated based on the difference between the third and fourth images. If the difference between the third and fourth images does not exceed a threshold difference, the error validator can determine that the error condition is invalid. For example, the error validator can determine that the error condition detected by the error detector is a false positive. Responsive to determining that the error condition is invalid, the method 300 can go to 315, in which a second image is captured. If the difference between the third and fourth images is at or greater than a threshold difference, the error validator can determine that the error condition is valid and the process can proceed to step 350.

At 350, the error validator can transmit an error indication. The error validator can transmit the error indication to any component of the camera system, such as the server, the client, or the image capture device. In some implementations, the error validator can transmit the indication as a signal including the indication and a command. The command can include instructions for presentation of the indication. For example, the command can include processing or presentation instructions for the application to present the indication via the display of the client. The command can include instructions for an actuation of the image capture device, such as capturing further images, changing the orientation of the image capture device, powering off the image capture device, or causing the image capture device to emit noise or light. The command can include instructions for presentation of the indication at the server, such as on a display coupled with the server. The command can include instructions for transmittal of a message to the client or server. The error validator can transmit the signal including the indication and the command to alert a user or device of the error condition.

Figure 4A:
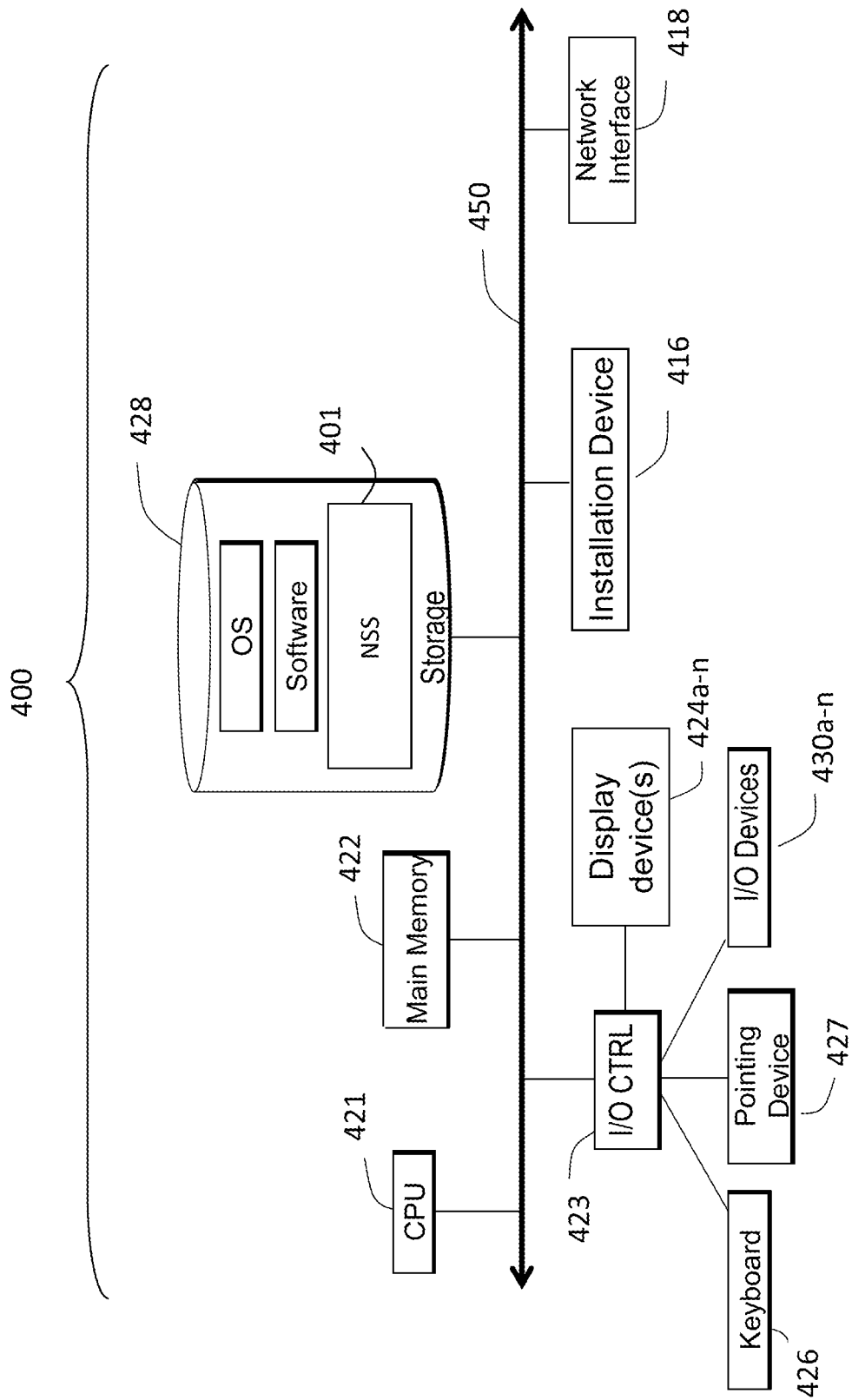
FIGS. 4A and 4B depict block diagrams of an example of a computing environment.
Figure 4B:
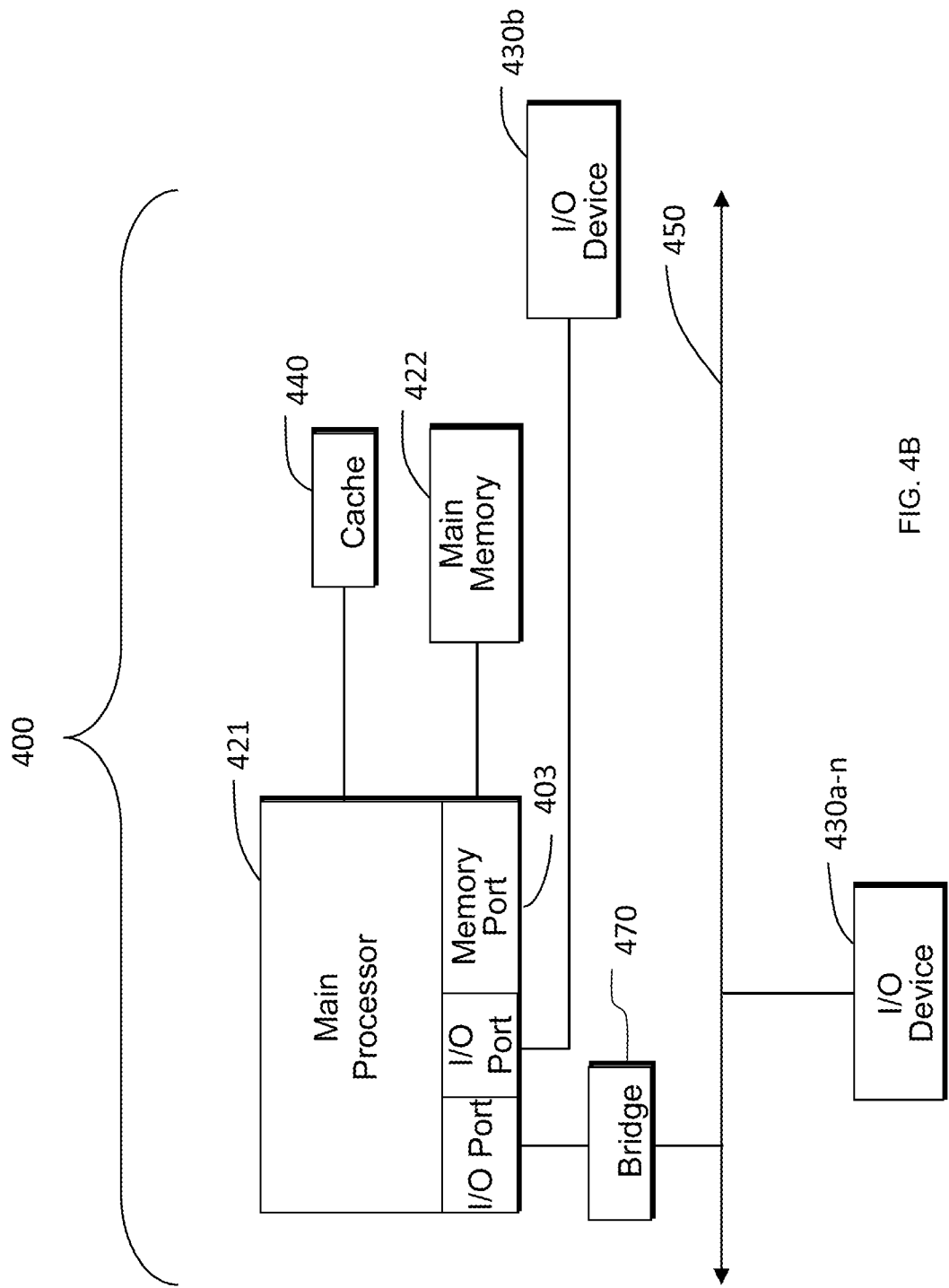

FIGS. 4A and 4B depict an example of a computing environment 400 that can be used to implement any of various systems, devices, and methods described herein, such as the camera system 200 or components thereof. The computing environment 400 can be used to implement any of various camera systems, image processing systems, security systems, video monitoring systems, or various combinations thereof.

As shown in FIGS. 4A and 4B, each computing device 400 includes a central processing unit 421, and a main memory unit 422. As shown in FIG. 4A, a computing device 400 can include a storage device 428, an installation device 416, a network interface 418, an I/O controller 423, display devices 424a-424n, a keyboard 426 and a pointing device 427, e.g. a mouse. The storage device 428 can include, without limitation, an operating system, software, and software of the system 200. As shown in FIG. 4B, each computing device 400 can also include additional optional elements, e.g. a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many implementations, the central processing unit 421 is provided by a microprocessor unit. The computing device 400 can be based on any of various processors capable of operating as described herein. The central processing unit 421 can utilize instruction level parallelism, thread level parallelism, different levels of cache, and multi-core processors. A multi-core processor can include two or more processing units on a single computing component.

Main memory unit 422 can include one or more memory chips capable of storing data and allowing any storage location to be directly accessed by the microprocessor 421. Main memory unit 422 can be volatile and faster than storage 428 memory. Main memory units 422 can be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some implementations, the main memory 422 or the storage 428 can be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 422 can be based on any of the above described memory chips, or any other available memory chips capable of operating as described herein. In the implementation shown in FIG. 4A, the processor 421 communicates with main memory 422 via a system bus 450 (described in more detail below). FIG. 4B depicts an implementation of a computing device 400 in which the processor communicates directly with main memory 422 via a memory port 403. For example, in FIG. 4B the main memory 422 can be DRDRAM.

FIG. 4B depicts an implementation in which the main processor 421 communicates directly with cache memory 440 via a secondary bus, sometimes referred to as a backside bus. In other implementations, the main processor 421 communicates with cache memory 440 using the system bus 450. Cache memory 440 typically has a faster response time than main memory 422 and is typically provided by SRAM, BSRAM, or EDRAM. In the implementation shown in FIG. 4B, the processor 421 communicates with various I/O devices 430 via a local system bus 450. Various buses can be used to connect the central processing unit 421 to any of the I/O devices 430, including a PCI bus, a PCI-X bus, or a PCI-Express bus, or a NuBus. For implementations in which the I/O device is a video display 424, the processor 421 can use an Advanced Graphics Port (AGP) to communicate with the display 424 or the I/O controller 423 for the display 424. FIG. 4B depicts an implementation of a computer 400 in which the main processor 421 communicates directly with I/O device 430b or other processors 421' via HYPER-TRANSPORT, RAPIDIO, or INFINIBAND communications technology. FIG. 4B also depicts an implementation in which local busses and direct communication are mixed: the processor 421 communicates with I/O device 430a using a local interconnect bus while communicating with I/O device 430b directly.

A wide variety of I/O devices 430a-430n can be present in the computing device 400. Input devices can include keyboards, mice, trackpads, trackballs, touchpads, touch mice, multi-touch touchpads and touch mice, microphones (analog or MEMS), multi-array microphones, drawing tablets, cameras, single-lens reflex camera (SLR), digital SLR (DSLR), CMOS sensors, CCDs, accelerometers, inertial measurement units, infrared optical sensors, pressure sensors, magnetometer sensors, angular rate sensors, depth sensors, proximity sensors, ambient light sensors, gyroscopic sensors, or other sensors. Output devices can include video displays, graphical displays, speakers, headphones, inkjet printers, laser printers, and 3D printers.

Devices 430a-430n can include a combination of multiple input or output devices. Some devices 430a-430n allow gesture recognition inputs through combining some of the inputs and outputs. Some devices 430a-430n provides for facial recognition which can be utilized as an input for different purposes including authentication and other commands. Some devices 430a-430n provides for voice recognition and inputs.

Additional devices 430a-430n have both input and output capabilities, including, e.g. haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices can have larger surfaces, such as on a table-top or on a wall, and can also interact with other electronic devices. Some I/O devices 430a-430n, display devices 424a-424n or group of devices can be augmented reality devices. The I/O devices can be controlled by an I/O controller 421 as shown in FIG. 4A. The I/O controller 421 can control one or more I/O devices, such as, e.g., a keyboard 126 and a pointing device 427, e.g., a mouse or optical pen. Furthermore, an I/O device can also provide storage and/or an installation medium 116 for the computing device 400. The computing device 400 can provide USB connections (not shown) to receive handheld USB storage devices. An I/O device 430 can be a bridge between the system bus 450 and an external communication bus, e.g. a USB bus, a SCSI bus, a FireWire bus, an Ethernet bus, a Gigabit Ethernet bus, a Fibre Channel bus, or a Thunderbolt bus.

Display devices 424a-424n can be connected to I/O controller 421. Display devices can include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMO-LED) displays, liquid crystal laser displays, time-multiplexed optical shutter (TMOS) displays, or 3D displays. Examples of 3D displays can use, e.g. stereoscopy, polarization filters, active shutters, or autostereoscopy. Display devices 424a-424n can also be a head-mounted display (HMD). In some implementations, display devices 424a-424n or the corresponding I/O controllers 423 can be controlled through or have hardware support for graphics libraries.

In some implementations, the computing device 400 can include or connect to multiple display devices 424a-424n, which each can be of the same or different type and/or form. As such, any of the I/O devices 430a-430n and/or the I/O controller 423 can include any type and/or form of suitable hardware, software, or combination of hardware and software to support, enable or provide for the connection and use of multiple display devices 424a-424n by the computing device 400. For example, the computing device 400 can include any type and/or form of video adapter, video card, driver, and/or library to interface, communicate, connect or otherwise use the display devices 424a-424n. In one implementation, a video adapter can include multiple connectors to interface to multiple display devices 424a-424n. The computing device 400 can include multiple video adapters, with each video adapter connected to one or more of the display devices 424a-424n. In some implementations, any portion of the operating system of the computing device 400 can be configured for using multiple displays 424a-424n. One or more of the display devices 424a-424n can be provided by one or more other computing devices 400a or 400b connected to the computing device 400, via the network 440. Software can be designed and constructed to use another computer's display device as a second display device 424a for the computing device 400. For example, a tablet or other portable electronic device can connect to a computing device 400 and use the display of the device 400 as an additional display screen that can be used as an extended desktop.

Referring again to FIG. 4A, the computing device 400 can comprise a storage device 428 (e.g. one or more hard disk drives or redundant arrays of independent disks) for storing an operating system or other related software, and for storing application software programs such as any program related to the software for the system 200. Examples of storage device 428 include, e.g., hard disk drive (HDD); optical drive including CD drive, DVD drive, or BLU-RAY drive; solid-state drive (SSD); USB flash drive; or any other device suitable for storing data. Some storage devices can include multiple volatile and non-volatile memories, including, e.g., solid state hybrid drives that combine hard disks with solid state cache. Some storage device 428 can be non-volatile, mutable, or read-only. Some storage device 428 can be internal and connect to the computing device 400 via a bus 450. Some storage device 428 can be external and connect to the computing device 400 via a I/O device 430 that provides an external bus. Some storage device 428 can connect to the computing device 400 via the network interface 418 over a network. Some client devices 400 can not require a non-volatile storage device 428 and can be thin clients or zero clients 202. Some storage device 428 can also be used as an installation device 416, and can be suitable for installing software and programs.

Computing device 400 can also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. Computing device 400 install software or applications from a source (e.g., server) maintained by a proprietor of the software or applications, such as a source independent of an application distribution platform.

Furthermore, the computing device 400 can include a network interface 418 to interface to the network 440 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one implementation, the computing device 400 communicates with other computing devices 400' via any type and/or form of gateway or tunneling protocol e.g. Secure Socket Layer (SSL) or Transport Layer Security (TLS). The network interface 118 can comprise a built-in network adapter, network interface card, PCMCIA network card, EXPRESSCARD network card, card bus network adapter, wireless network adapter, USB network adapter, modem or any other device suitable for interfacing the computing device 400 to any type of network capable of communication and performing the operations described herein.

A computing device 400 of the sort depicted in FIG. 4A can operate under the control of an operating system, which controls scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein.

The computer system 400 can be any workstation, telephone, desktop computer, laptop or notebook computer, netbook, tablet, server, handheld computer, mobile telephone, smartphone or other portable telecommunications device, media playing device, a gaming system, mobile computing device, or any other type and/or form of computing, telecommunications or media device that is capable of communication. The computer system 400 has sufficient processor power and memory capacity to perform the operations described herein. In some implementations, the computing device 400 can have different processors, operating systems, and input devices consistent with the device.

In some implementations, the communications device 400 includes a combination of devices, e.g. a smartphone combined with a digital audio player or portable media player. For example, one of these implementations is a smartphone. The communications device 400 can be a laptop or desktop computer equipped with a web browser and a microphone and speaker system, e.g. a telephony headset. The communications devices 400 can be web-enabled and can receive and initiate phone calls. In some implementations, a laptop or desktop computer is also equipped with a webcam or other video capture device that enables video chat and video call.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the implementations disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, soc (system on chip), som (system on module) or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary implementation, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or implementation, and references to "an implementation," "some implementations," "one implementation" or the like are not necessarily mutually exclusive and are intended to indicate that a particular feature, structure, or characteristic described in connection with the implementation can be included in at least one implementation or implementation. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary implementations, and that such variations are intended to be encompassed by the present disclosure.

What is claimed is:

1. A camera system, comprising:
   at least one image capture device;
   at least one light source coupled with the at least one image capture device; and
   one or more processors configured to:
      detect an error condition based on one or more first images captured by the at least one image capture device; and
      responsive to detecting the error condition:
         retrieve a second image captured by the at least one image capture device and a third image captured by the at least one image capture device, the second image associated with the at least one light source being in an off state, the third image associated with the at least one light source being in an on state;
         determine that the error condition is valid based on a comparison of image data of the second image with image data of the third image; and
         output an indication of the error condition responsive to determining that the error condition is valid.

2. The camera system of claim 1, wherein the at least one light source comprises an infrared light-emitting diode (LED).

3. The camera system of claim 1, wherein the one or more processors are configured to output the indication as a signal comprising the indication and a command to cause a remote device to present an alert regarding the indication.

4. The camera system of claim 1, wherein the one or more processors are configured to detect the error condition by detecting a threshold difference between image data of the one or more first images and one or more reference edges of one or more reference images.

5. The camera system of claim 1, wherein the at least one image capture device comprises at least one processor of the one or more processors.

6. The camera system of claim 1, wherein the one or more processors are configured to provide a signal to the at least one light source to set the at least one light source to the on state responsive to detecting the error condition.

7. The camera system of claim 1, wherein the one or more first images comprise the second image.

8. The camera system of claim 1, wherein the one or more processors are configured to:
   determine, prior to retrieving the second image, that the at least one light source is in the on state;
   cause the at least one light source to be in the off state; and
   cause the at least one image capture device to capture the second image responsive to causing the at least one light source to be in the off state.

9. The camera system of claim 1, wherein the one or more processors are configured to determine that the error condition is valid responsive to the comparison of the image data of the second image with the image data of the third image indicating at least a threshold difference between the image data of the second image and the image data of the third image.

10. The camera system of claim 9, wherein the one or more processors are configured to set the threshold difference according to an input received via a user interface.

11. A method, comprising:
  retrieving, by one or more processors, first image data of one or more first images captured by at least one image capture device while a light source is in an off state;
  retrieving, by the one or more processors, second image data of one or more second images captured by the at least one image capture device while the light source is in an on state;
  comparing, by the one or more processors, the first image data with the second image data to determine that an error condition is satisfied; and
  transmitting, by the one or more processors to a client device, a signal indicative of the error condition responsive to determining that the error condition is satisfied.

12. The method of claim 11, further comprising generating, by the one or more processors, the signal to include a command to cause a remote device to present an alert regarding the error condition.

13. The method of claim 11, further comprising detecting, by the one or more processors, the error condition responsive to comparing one or more edges of at least one of the first image data or third image data of a third image with one or more edges of a reference image.

14. The method of claim 13, further comprising causing the at least one image capture device to capture the one or more first images and the one or more second images responsive to detecting the error condition.

15. The method of claim 11, wherein the one or more first images comprise a plurality of first images, and comparing the first image data with the second image data comprises comparing an average value of a parameter of the plurality of first images with a corresponding value of the parameter of the second image data.

16. An image capture device, comprising:
  an image sensor; and
  one or more processors configured to:
    detect an error condition based on first image data from the image sensor; and
    responsive to detecting the error condition:
      retrieve second image data and third image data from the image sensor, the second image data associated with at least one light source being in an off state, the third image data associated with the at least one light source being in an on state;
      determine that the error condition is valid based on a comparison of the second image data and the third image data; and
    output an indication of the error condition responsive to determining that the error condition is valid.

17. The image capture device of claim 16, further comprising the at least one light source, wherein the at least one light source comprises an infrared LED.

18. The image capture device of claim 16, wherein the one or more processors are configured to output the indication, using communications circuitry, as a signal comprising the indication and a command to cause a remote device to present an alert regarding the indication.

19. The image capture device of claim 16, wherein the one or more processors are configured to detect the error condition by detecting a threshold difference between the first image data and one or more reference edges of one or more reference images.

20. The image capture device of claim 16, further comprising a light sensor coupled with the image capture device, the one or more processors configured to control operation of the at least one light source according to a signal from the light sensor.

* * * * *